(12) United States Patent
Korhonen

(10) Patent No.: US 7,747,338 B2
(45) Date of Patent: Jun. 29, 2010

(54) AUDIO SYSTEM EMPLOYING MULTIPLE MOBILE DEVICES IN CONCERT

(75) Inventor: John V. Korhonen, Letchworth Garden City (GB)

(73) Assignee: Xerox Corporation, Norwalk, CT (US)

( * ) Notice: Subject to any disclaimer, the term of this patent is extended or adjusted under 35 U.S.C. 154(b) by 985 days.

(21) Appl. No.: 11/506,365

(22) Filed: Aug. 18, 2006

(65) Prior Publication Data

US 2008/0045140 A1 Feb. 21, 2008

(51) Int. Cl.
*G06F 17/00* (2006.01)
*H04H 40/00* (2008.01)
(52) U.S. Cl. .................................. 700/94; 455/3.06
(58) Field of Classification Search .................. 700/94; 455/3.06, 41.3; 369/1–12; 381/300, 306, 381/307, 27
See application file for complete search history.

(56) References Cited

U.S. PATENT DOCUMENTS

| 7,539,551 | B2 * | 5/2009 | Komura et al. ............. 700/94 |
| 2006/0087941 | A1 | 4/2006 | Obradovich |
| 2006/0089736 | A1 | 4/2006 | Kazuta et al. |

* cited by examiner

*Primary Examiner*—Andrew C Flanders
(74) *Attorney, Agent, or Firm*—Fay Sharpe LLP

(57) ABSTRACT

An audio reproduction system includes a plurality of mobile devices, such as mobiles phones. Each of the mobile devices includes a loudspeaker, memory for storing audio data, and instructions, stored in memory, for prompting the plurality of mobile devices to each output at least a portion of an audio data file to the loudspeaker of the respective mobile device. A processor is configured for executing the instructions, thereby enabling contemporaneous play of the audio data file by the plurality of mobile devices.

19 Claims, 4 Drawing Sheets

AUDIO SYSTEM EMPLOYING MULTIPLE MOBILE DEVICES IN CONCERT

BACKGROUND

The exemplary embodiment relates to mobile communication devices. It finds particular application in connection with a music reproduction system for rendering an audio file which employs multiple mobile devices synchronized for contemporaneous rendering of the audio file.

Mobile communication devices for wireless transmission and receipt of voice communications, such as mobile phones, are now in widespread use. Such devices are increasingly used for storage and replay of audio files, such as music, voice recordings, and files with both audio and video components, such as movies. Users are now able to download music and video files into a memory storage card in the mobile device and select files for reproduction from a menu displayed on a liquid crystal display screen. The mobile device typically has a small loudspeaker integral with the device. While the loudspeaker is generally adequate for outputting voice communications, sound quality for reproduction of audio files tends to be poor and allows single channel (mono) reproduction only. While headphones may be plugged into the device for listening to the audio file, this is inconvenient when several people are present.

BRIEF DESCRIPTION

In accordance with one aspect of the exemplary embodiment, an audio reproduction system includes a plurality of mobile devices. Each of the mobile devices includes a loudspeaker, memory for storing audio data, instructions, stored in memory, for prompting the plurality of mobile devices to each output at least a portion of an audio data file to the loudspeaker and a processor which executes the instructions for contemporaneous play of the audio data file by the plurality of mobile devices.

In another aspect, a mobile device includes a loudspeaker, memory for storing audio data files, and a processor which executes instructions for synchronizing a plurality of mobile devices including the mobile device and for outputting at least a portion of an audio data file to the loudspeaker for synchronized play of the audio data file by the plurality of mobile devices.

In another aspect, a method for playing an audio file includes assigning at least a portion of the audio file to each of a plurality of mobile devices, synchronizing the mobile devices, and playing the assigned portions of the audio file contemporaneously on the synchronized mobile devices such that a listener positioned to hear the plurality of mobile devices hears the audio file.

DETAILED DESCRIPTION

Aspects of the exemplary embodiment relate to an audio system and to a method of outputting audio data with multiple mobile devices.

Figure 1:
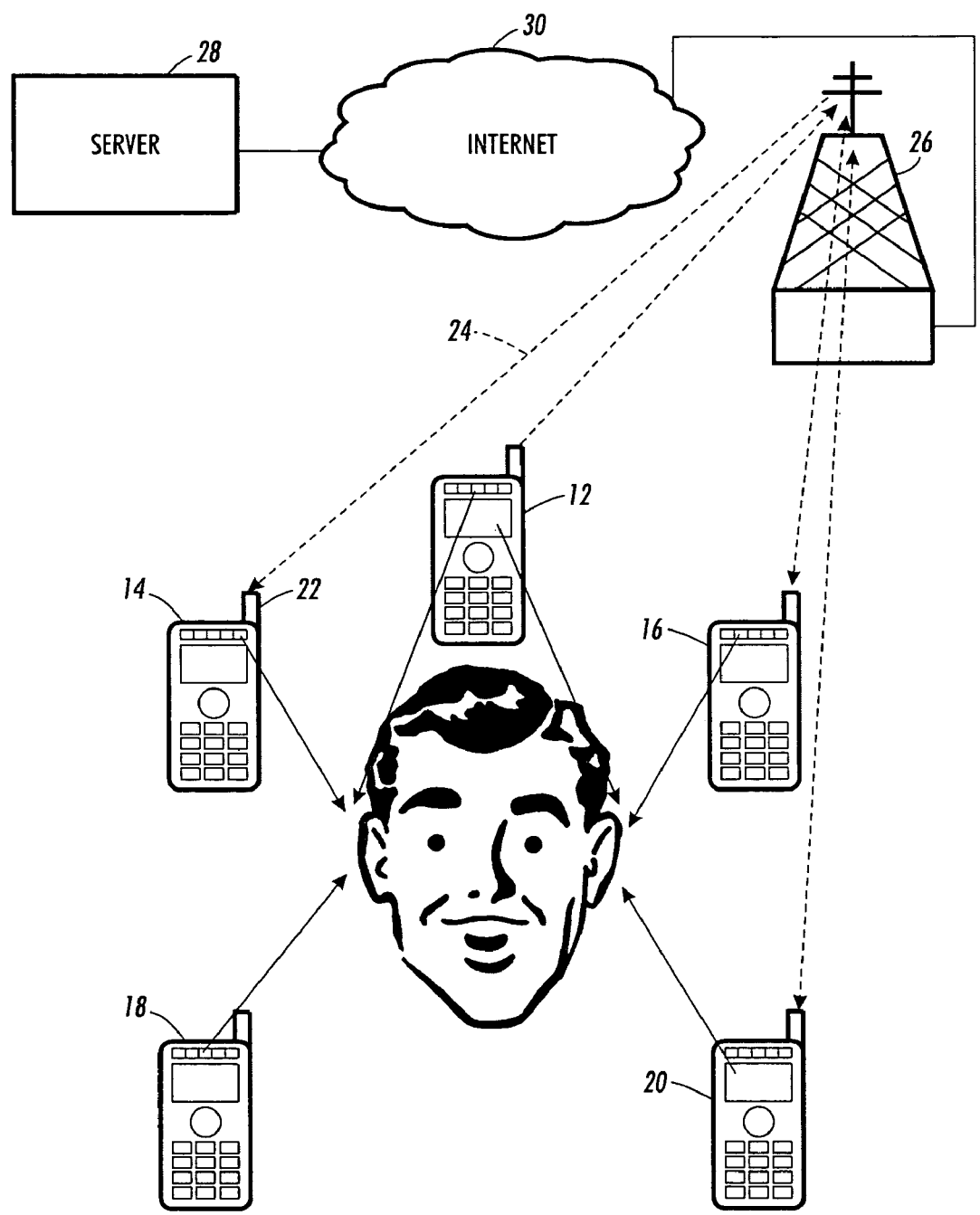
FIG. 1 is a schematic view of a wireless network in which multiple mobile devices are programmed to act in concert for reproduction of an audio file.

With reference to FIG. 1, an exemplary audio reproduction system 10 for sound reproduction of digital audio data is shown. The system 10 includes a group of mobile devices 12, 14, 16, 18, 20, each having wireless data transmitting and receiving capability and audio output capability. The mobile devices are used in concert to reproduce an audio file. Each of the mobile devices 12, 14, 16, 18, 20 may be assigned an audio channel of the file whereby multi-channel sound reproduction is achieved. The wireless mobile devices 12, 14, 16, 18, 20 may be mobile phones having voice communication capability or may be devices primarily intended for playing of audio data files which may also have wireless communication capabilities. When the system is playing an audio file, such as a music file or an audio component of a video file, the outputs of the two or more mobile devices are synchronized such that their combined outputs reproduce the audio file. Each of the mobile devices has a copy of the audio file or play list (a selection of audio files) to be played, or a selected channel of the file(s). This can be enabled by swapping memory storage cards or by transmitting the files by a communications link, e.g., cable or wireless. Wireless transfer may be effected though a direct wireless link, such as Bluetooth, or via a communications network, such as a wireless phone network. The transfer/download of the audio data may be completed prior to the start of the joint replay or may continue during the replay (e.g., in the case of a radio transmission). In one embodiment, each of the mobile devices has a copy of the audio file(s) to be played, which may have been previously downloaded from a server or from a computer or other storage device for digital audio files.

The exemplary audio system 10 includes five wireless mobile communication devices 12, 14, 16, 18, 20, herein illustrated as mobile phones. Other mobile devices are also contemplated, such as MP3 players, cameras, personal digital assistants (PDAs) and the like having capability for playing digital audio files and inter-device communication. The mobile devices 12, 14, 16, 18, 20 are generally pocket-sized devices which are readily portable and can be used in locations where no external power source is available. The audio system 10 can thus be established by bringing together two or more of the mobile devices in the same location, such as within the same room, or within about 5 meters of each other, without the need for additional speakers or wiring. Although five mobile devices are illustrated, it is contemplated that there may be fewer or more than five mobile devices. For example, two, four, six, or more of such devices may be used in concert as an audio system 10. The mobile devices may be similarly configured and are described with reference to an exemplary mobile device 12.

In playing a music file in a multi-device mode, such as a multi-channel mode, one of the mobile devices (device 12 in the exemplary embodiment) serves as a master device while the other participating mobile devices (14, 16, 18, 20) are slaves. In general, the master device 12 is used for selection of the audio file, communicating with the other mobile devices selected as participants, optionally, transferring a copy of the audio file or selected channel thereof between the master device and one or more of the other participant devices, and prompting the other mobile devices to begin play, thereby achieving synchronizing playing of the file or of respective channels of the audio file by the selected participant devices. However, it is also contemplated that the mobile devices may share in performing these operations, for example, one device may transfer the files while another prompts the others to begin play. It is also contemplated that the master device may simply serve as controller for the other mobile devices and may not play the audio file, if for example, multiple mobile devices are available. In general, all of the devices 12, 14, 16, 18, 20 include the software instructions for prompting other devices to play the same audio file and for playing an audio file when prompted by another mobile device to do so. Accordingly, any of the devices may serve as the master device, depending on the user's preference.

Mobile device 12 includes an antenna 22 for transmitting and receiving audio signals. The signals are generally transmitted in the radiofrequency range, from about 30 Hz to about 300 GHz. The mobile device 12 may communicate wirelessly with other voice communication devices, such as devices 14, 16, 18, 20, via a wireless network 24 which includes one or more communication stations 26. The mobile device 12 may communicate, via the network 24, with a server 28, e.g., via the internet 30. The server, in turn, provides audio data, such as music files, audio/video files, and/or streamed radio/television transmission, to the mobile device 12 via the network.

Figure 2:
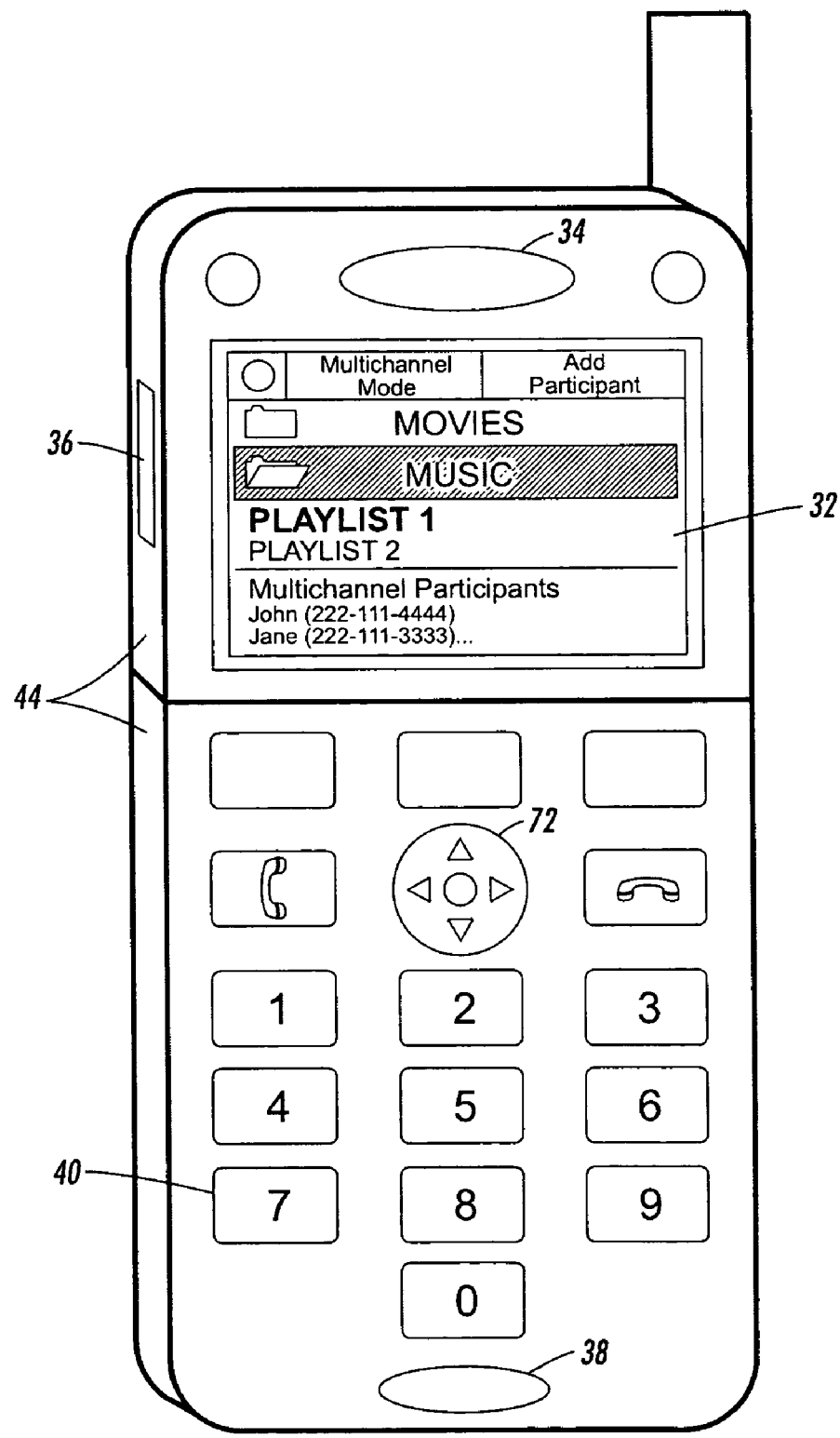
FIG. 2 is a perspective view of an exemplary mobile device in the system of FIG. 1.

As illustrated in FIG. 2, the mobile device 12 also includes a display 32, such as a liquid crystal display (LCD) screen, which serves as a graphical user interface for selection of audio data files from a list and selection of other mobile device participants in the audio system. The mobile device 12 also includes a conventional earphone 34, a loudspeaker 36, a microphone 38, a user interface 40 in the form of a keypad, and a rechargeable battery 42. The user interface 40 may incorporate other user input devices, such as a keyboard, mouse, rotating wheel, toggle switches, gamepad, joystick device, touch screen input device, and combinations thereof. The mobile device 12 includes appropriate components for converting digital audio signals into sound and amplifying the sound which the loudspeaker 36 outputs. Typically, the output sound can be heard a distance from the mobile device, such as at least about 3 or 5 meters away, so that a person can hear the sound without placing the mobile device 12 too close to the ear. The mobile device 12 may include other conventional components not illustrated.

The mobile device 12 typically includes a shell or housing 44 (FIG. 2). All of the above mentioned components 22, 32, 34, 36, 38, 40, 42 of the mobile device may be associated with the housing, i.e., are located either within or on the housing 44. The housing may be a single housing or of a clamshell type construction in which the two housing parts are joined at a pivot point.

Figure 3:
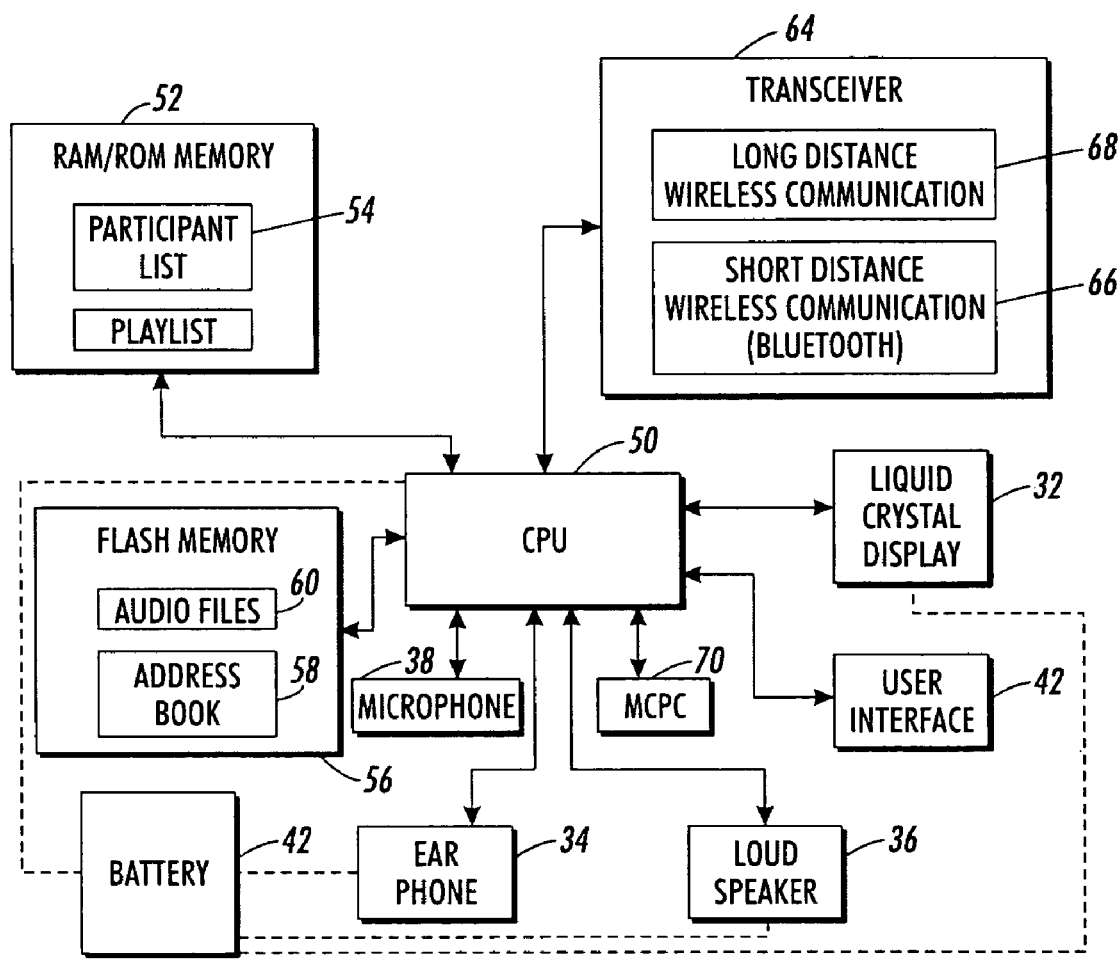
FIG. 3 is a functional block diagram of the mobile device of FIG. 3.

FIG. 3 is a block diagram illustrating the functional components of the mobile device. The mobile device includes a central processing unit (CPU) or main processor 50 and volatile and non-volatile memory, herein illustrated as comprising Random Access Memory (RAM) and/or ROM memory 52 and including a cache area for the temporary storage of data, such as a list of participants 54 and play lists to be displayed on screen 32 as well as flash memory 56, at least a portion of which may be in the form of a removable memory card or cards, e.g., a universal integrated circuit card, such as a subscriber identity module (SIM) card. The various components communicate via suitable data/control buses. Memory 52 stores instructions for the processor 50, including instructions for performing the exemplary method outlined below and illustrated in FIG. 4. Memory 56 may store an address book 58 listing telephone numbers as well as downloaded data files 60, such as audio data files. The digital audio files may be in any suitable format, such as MP3, WAV, AAC, AAC+, or narrow or wide band AMR. As will be appreciated, the audio files may be stored in any suitable memory not limited to those described. The memory 56 can include an identifier, such as an international mobile equipment identification (IMEI) code, capable of uniquely identifying the mobile device to the communication station 26 and to each other.

The CPU 50 may run an operating system such as Symbian™ or Microsoft Smartphone (in the case of cell phones) or PalmOS (in the case of a PDA) stored in memory 52, which permits software to be downloaded, e.g., from a PC or from a server, e.g., via the Internet. The software that includes the instructions for performing the exemplary method may thus be resident on the mobile device 12 at the time of purchase or downloaded later, in whole or in part, onto a compatible mobile device. Suitable software formats include JavaScript (also known as ECMAScript), Java 2 Micro Edition (J2ME), Personal Java Application Environment (PAE), C++, Visual Basic (VB), or the like.

The mobile device 12 includes a transceiver 64, associated with the antenna 22, which serves as an interface for short distance and long distance wireless communication and is in communication with the CPU 50. Short distance wireless communication here denotes wireless communication over a short distance, for example, about 100 meters or less, typically, about 10 meters (i.e., too short to reach the communication station 26, but long enough to reach the other participating mobile devices). Exemplary short distance wireless systems include Bluetooth, IrDa, and Wifi. In the Bluetooth interface protocol, a maximum communication speed is 1 Megabit per second, and a frequency of 2.4 GHz is used, the frequency being equal to that used in the IEEE 802.11b system wireless LAN. Other short distance wireless communication protocols, such as a UWB specification, an infrared-ray communication specification, or a wireless LAN (IEEE 802.11) specification, or the like may alternatively or additionally be provided for direct communication between the participating devices. Long distance wireless communication here denotes wireless communication over a longer distance, for example, about 1 kilometer or more, typically, about 5-10 kilometers, through which the mobile device 12 communicates wirelessly with the base station 26. In general, the frequency at which such signals are transmitted is lower than for short distance transmissions. As will be appreciated, separate transceivers and/or antennae may be provided for the short and longer distance transmissions, respectively.

Instructions may be sent automatically from the master device 12 to the slave devices 14, 16, 18, 20. For example, the Short Message Service (SMS), which provides mobile devices with the ability to send text messages from one mobile device to one or more other mobile devices may be utilized. Another service which may be utilized is MMS (multimedia message service), which enables a message with a combination of sound, text and pictures to be sent between MMS-compatible mobile devices.

As illustrated in FIG. 1, the antennae 22 of the mobile devices propagate and receive communication signals, for example radio frequency communication signals. The wireless transceiver 64 processes the signals and provides information therein to the CPU 50. The CPU generally controls operation of various aspects of the device, generally using instructions stored in the memory. Under general command of the CPU, audio output based on the audio files stored in memory 56, 52 is provided through the loudspeaker 36 and optionally video output based on the audio/video files is provided through the display 32.

The mobile device 12 also includes a multi-device processing component (MDPC) 70 for initiating and playing an audio file in a multi device, e.g., multi-channel mode. The MDPC 70 may be a part of the CPU or an add-on component in communication therewith, as shown. The MDPC 70 is configured for executing instructions, stored in memory 52, for selection of a multi-channel audio file, selection of participating mobile devices, allocating channels of the selected file to the participating mobile devices (where multi-channel play is selected), communicating with the other participating mobile devices, and prompting them to play the audio file in a synchronized fashion.

As will be appreciated, the processors 50, 70 and memory 52, 56 may be in other forms than those specifically illustrated. For example, all or a portion of the processor(s) may be combined with some or all of the memory into a single chip. Or, the device may include fewer or more processing components and/or memory. The processing instructions, audio data files, and so forth may be stored in separate memory or be stored in the same memory.

The keypad 40 includes a number of operating switches. These switches include: a menu button 72 for calling a menu screen when setting a variety of operational settings and selection of audio files and participants in an audio file reproduction.

All of the above mentioned components 50, 52, 56, 64, 70 of the mobile device may be associated with the housing 44, i.e., are located either within or on the housing.

Figure 4:
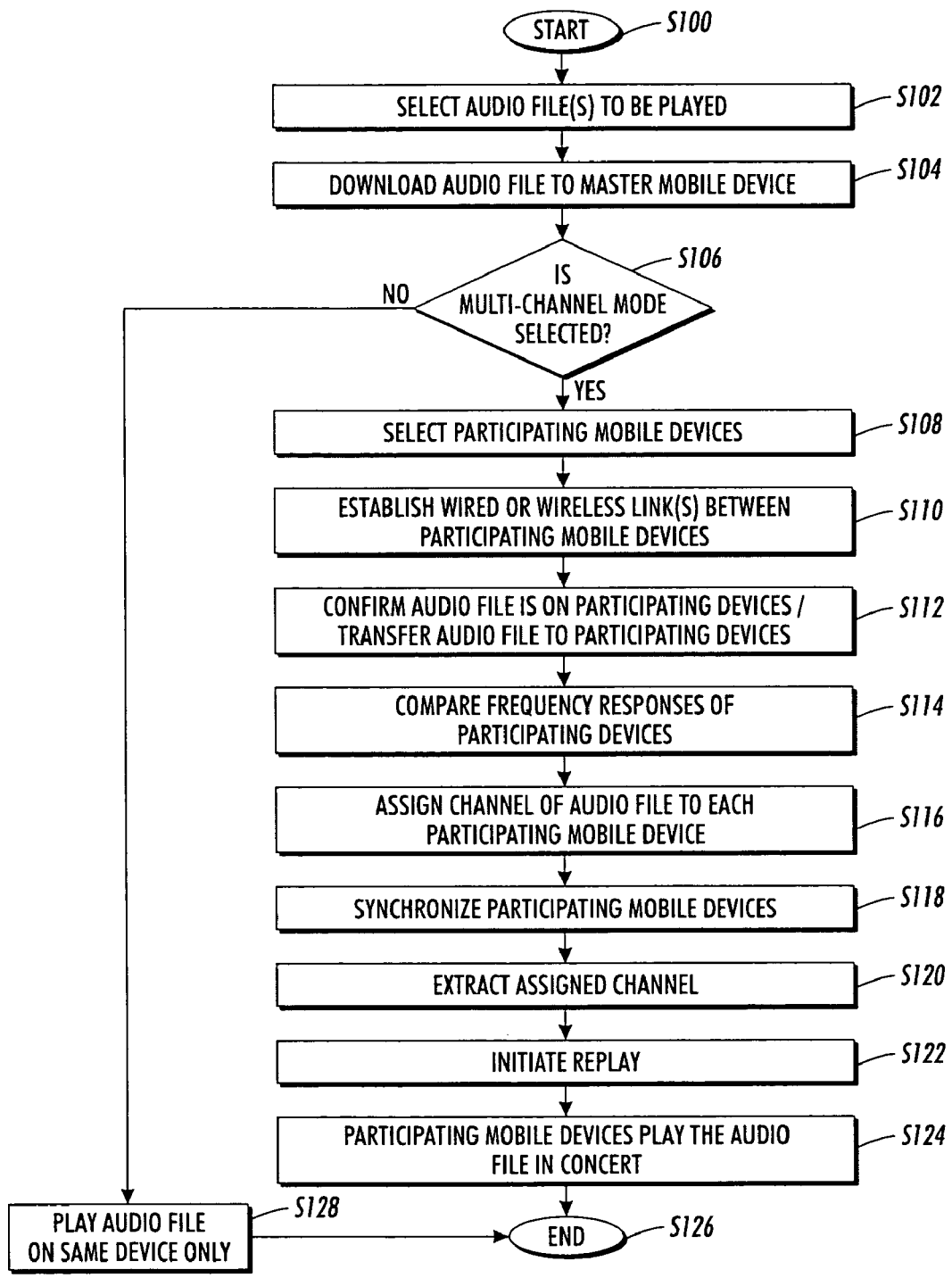
FIG. 4 is a flow diagram illustrating an exemplary method of playing an audio file with multiple mobile devices.

With reference now to FIG. 4, an exemplary method of playing an audio file using the system 10 is illustrated. It is to be appreciated that the method may include fewer, more, or different steps and that the steps need not be performed in the order illustrated. The method begins at step S100.

At step S102, a user selects a multi-channel audio file to be played. For example, using the menu button, the user scrolls though a list of audio files, such as music files and selects, e.g., by clicking on, one or more of the files to be played. Where the selected file is not already resident in the memory of the user's device 12, the mobile phone may communicate wirelessly with the server 28 which transfers the file to the master device's memory 56 (Step S104). If the file is already resident on the device 12, this step can be omitted.

At step S106, a user may elect to play the file in a multi-device (e.g., multi-channel) mode. If the user elects the multi-device mode, the MDPC 70 may automatically cause the screen 32 to display a menu for selection of participating mobile phones. The user may select the participants from his address book or by inputting the telephone number or other unique ID of the selected slave devices or select from a list of mobile phones detected by the MDPC as being within communication range (step S108). Once the user has selected the audio file(s) and participants and requested play (e.g., by pressing a button on the user interface), the remaining steps may proceed automatically under the control of the CPU/MDPC, except as otherwise noted.

At step S110, a communication link is established whereby the MDPC 70 communicates with the selected mobile devices, for example using the Bluetooth interface. Alternatively, the MDPC may communicate wirelessly, via the base station 26 or by a cable link between the master and slave mobile devices.

At step S112, the master device 12 confirms that each of the slave devices selected has a copy of the file or play list to be played in multi-device mode. If any of the devices does not have the file, the MDPC 70 may initiate automatic transfer/download of the file according to a predefined procedure. Or, the user may be prompted to select a method for establishing the audio file (or a channel thereof) on the slave device, such as through wired or wireless transfer of the file, downloading the file from a server 28 directly onto the slave device or indirectly via a PC, or the like. In general, it is desirable for the mobile devices to play from an identical version of the file, i.e., one from the same original source which is downloaded at the same rate (Kb/second) so that it is of the same quality. In one embodiment, the user may place the memory card on which the audio file is stored into each of the selected mobile devices in turn and store the selected audio file in the memory 52, 56 of the slave devices. Where permission restrictions on file transfer restrict the transfer of files, the transferred audio file may automatically be deleted after being played or after a certain time delay. For example, the audio file may be stored temporarily in volatile memory with permission for single use play in concert with the device having permission to play the audio file. Or a partial transfer may be established where a portion of the audio file is transmitted and stored in a buffer and deleted from the buffer as subsequent portions of the file (to be played later in time) are transmitted. In one embodiment, the audio file is associated with a unique identifier, such as an alphanumeric code. The identifier is transmitted, e.g., by the master device, to a server, which then provides an identical copy of the file, with instructions for encoding at a specified rate, to the slave device so that the versions of the file on the master and slave device(s) are essentially identical.

At step S114, the master device 12 may interrogate the other selected participant devices 14, 16, 18, 20 to determine a frequency response range of the respective device's loudspeaker. Where the participating mobile devices have different frequency responses, the master device may allocate channels to the participating devices based on their frequency responses (e.g., a channel with lower frequencies to a device with good response in the low frequency range, and so forth).

At step S116, the participating devices may each be assigned a channel of the multi-channel file (and/or a frequency range) for multi-channel play. Where there are more devices than channels in an audio file, two or more devices may be assigned the same channel. Where there are fewer devices than channels, a mobile device may be assigned two or more channels. In one embodiment, the MDPC assigns the channels by notifying each mobile device which channel-it will play. In another embodiment, the user is queried as to which device is to be assigned a particular channel in order to provide surround sound, which may depend on the positions of the participating devices in a room. For example, the user may assign audio channels to mobile phones in front left and right locations to serve as front speakers, and assign corresponding rear speaker audio channels of the audio file to mobile phones in rear left and right locations, relative to the user, as well as a fifth mobile phone as a central channel, to resemble surround sound speakers. For stereo, two channels may be used, representing left and right speakers. Alternatively, the assigned channels may be in the form of frequency bands, each frequency band representing only a portion of the bandwidth that a mobile device can reproduce, with participating devices being assigned a different frequency band. Thus, for example, one participating device may be assigned a high frequency band (such as 1000-20,000 Hz), a second mobile device may be assigned a mid frequency band (such as 150-999 Hz), and a third mobile device may be assigned a lower frequency band (such as 20-149 Hz), and so forth. In another embodiment, all the participant devices may be assigned to play the entire file, e.g., where the audio file is a single channel (mono) audio file.

At step S118, the participating devices 12, 14, 16, 18, 20 are synchronized to play their respective channels. Synchronization ensures that the mobile devices all play the audio file contemporaneously (at least to the user's ear). Synchronization may take into account the standard delay of the speaker system of each device and/or any other delays occurring between a device receiving a play command and the actual start of play. In one synchronization method, each participating slave device transmits its standard delay to the master device. The master device then computes appropriate times at which to provide a signal, such as a pulse, to each of the slave devices, for initiating play, which takes into account the delay. The pulse times for may thus be staggered, depending on the delays of the various devices, so that the devices all begin to play at the same time (or at least, to reduce the effects of the respective delays on the start time). For example (at step S122), the master device sends a first pulse, recognized by a first device, to initiate play of the first device, and a second pulse, slightly later, to a second device (having a shorter delay) to initiate play of the second device, and so forth.

In another embodiment, the master device may compute the times at which the play initiation pulses should be sent out from response times to a test signal. In this embodiment, the master device sends a test signal, such as a pulse, to each of the devices. The slave devices are instructed, prior to sending the test pulse, to initiate play of a test sound when they receive the test pulse. The master device then records a time at which the test sound is received by the master device after the test pulse has been sent and computes the delay. This method takes into account not only the internal delay of the device but also the external delay as a result of the time taken for the test pulse to reach the device and the time taken for the test sound to travel through the air to the master device. Assuming the listeners will be located closer to the master device than the slave devices, this may provide a more accurate synchronization of the sound. The accuracy of the synchronization will depend, to some degree, on the processing capability of the master device and the accuracy with which timing pulses can be sent.

In another embodiment, the slave devices are instructed to each compute their own start time such that the loudspeakers all begin play a specific time after they receive the play initiation pulse, such as a one second delay or a five second delay. The instructions as to when to begin after a play initiation pulse may be part of the software, and thus resident on the slave devices. Each device computes its own actual start time by subtracting its standard delay, which may be about 50 or 100 milliseconds, from the specific time. A single synchronization pulse is subsequently sent by the master device to all the devices to initiate play (see step S122). For a device with a known delay of 100 milliseconds, the device may start 900 milliseconds after receiving the pulse so that its loudspeaker starts play one second after the pulse, along with the other devices.

In yet another embodiment, all the devices are simply instructed to begin play as soon as they receive the synchronization pulse (or at a preselected time thereafter). This embodiment ignores the delays of the individual mobile phones and differences in time for the sound to travel, but may nonetheless provide satisfactory synchronization when the standard delay times are relatively similar and the spacing of the devices is fairly close, such as within about 5 meters of the master device.

At step S120, the participating mobile devices may extract the assigned channel from the audio file. For example, the MDPC of each participating device uses available embedded audio signal processing (e.g., an RF bandwidth limiting filter) to filter the correct part of the audio file for replay. As will be appreciated, the extraction of the assigned channel may begin as soon as the channel has been assigned.

At step S122, the master device initiates the replay of the audio file or selected play list. For example, the master device may send a signal, such as synchronization pulse, to the slave mobile devices to start the joint replay. The signal may be sent as an audible signal via the air which is sufficiently loud to be picked up by the microphone of the mobile devices, or as a digital signal, via the wired or wireless communication link. Further synchronization pulses may be sent subsequently, for example at the start of each music track.

At step S124, the mobile devices start the joint replay shortly after the synchronization pulse. Typically, the replay involves converting the audio data to sound waves with a suitable digital to analog converter, optionally amplifying (or dampening) the sound by means of an amplifier such as an RF receiving gain variable amplifier, and outputting the amplified sound via the loudspeaker. As will be appreciated, if the audio file is an audiovisual file, the video portion of the file may be displayed on the screen 32 of one or more of the participating mobile devices simultaneously with the audio portion. The method ends at step S126. Of course, if the user elects not to play the audio file in multi-device mode at step S106, then the method may proceed to step S128, where the audio file is played on the user's device only.

The instructions for performing the method of FIG. 4 may be implemented in a computer program product that may be executed by the multi-device processing component 70. The computer program product may be a computer-readable recording medium on which a control program is recorded, or may be a transmittable carrier wave in which the control program is embodied as a data signal.

The exemplary system and method enables several people to listen to an audio file using their mobile devices, without the need for a separate loudspeaker system. The system finds particular application when a group of people assembles and does not have ready access to a conventional audio system. Having multiple mobile devices playing the same audio file also has the advantage that the output is louder. Moreover, fidelity can be improved by assigning only a portion of the audio file to each device. Finally, the audio file can be played in stereophonic, quadraphonic or other multi-channel mode.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An audio reproduction system comprising:
   a plurality of mobile phones, each of the mobile phones comprising:
   a loudspeaker;
   memory for storing audio data; instructions, stored in memory, for prompting the plurality of mobile phones to each output at least a portion of an audio data file to the loudspeaker of the mobile phone for achieving contemporaneous play of the audio data file by the plurality of mobile phones; and
   a processor which executes the instructions, the processor of one of the plurality of mobile phones executing instructions for comparing frequency responses of the plurality of mobile phones, and assigning a frequency band to each of the other mobile phones whereby a first of the mobile phones plays audio data in a first frequency band and a second of the mobile phones plays audio data in a second frequency band, the assigning of the frequency band to each of the other mobile phones being based on the respective frequency responses.

2. The system of claim 1, wherein the instructions include instructions for synchronizing the plurality of mobile phones for synchronized play of the audio data file by the plurality of mobile phones.

3. The system of claim 1, wherein each of the mobile phones comprises a wireless transceiver and the processor is programmed to cause the transceiver to pulse a synchronization pulse for initiating synchronized play by others of the mobile phones and programmed to initiate play in response to a synchronization pulse received from another of the mobile phones.

4. The system of claim 1, wherein the audio file comprises a plurality of channels and wherein the instructions include instructions for prompting a first of the mobile phones to play a first of the channels and a second of the mobile phones to play a second of the channels.

5. The system of claim 1, wherein the audio file comprises at least one of a music file, a radio transmission, and a video file with an audio component.

6. The system of claim 1, wherein the instructions include instructions for transmitting a synchronization pulse from a first of the mobile phones to a second of the mobile phones.

7. The system of claim 1, wherein the mobile phones each include a transceiver for short distance wireless communication and wherein the instructions include instructions for prompting other mobile phones from the plurality of phones by short distance wireless communication.

8. The system of claim 1, wherein each of the mobile phones includes a housing and wherein the loudspeaker, memory, and processor are associated with the housing.

9. A mobile phone comprising:
a loudspeaker;
memory for storing audio data files; and
a processor which executes instructions for synchronizing a plurality of mobile phones including the mobile phone and for outputting at least a portion of an audio data file to the loudspeaker for synchronized play of the audio data file by the plurality of mobile phones, the processor configured for executing instructions for comparing frequency responses of the plurality of mobile phones and assigning a frequency band to each of the mobile phones based on the frequency responses, whereby a first of the mobile phones plays audio data in a first frequency band and a second of the mobile phones plays audio data in a second frequency band.

10. A method for playing an audio file comprising:
assigning at least a portion of the audio file to each of a plurality of mobile phones, the assigning including interrogating the mobile phones to determine a frequency response range of the respective mobile phone's loudspeaker, comparing the frequency responses of the plurality of mobile phones, and assigning a frequency band to each of the mobile phones based on the frequency responses, whereby a first of the mobile phones plays audio data in a first frequency band and a second of the mobile phones plays audio data in a second frequency band;
synchronizing the mobile phones; and
playing the assigned portions of the audio file contemporaneously on the synchronized mobile phones such that a listener positioned to hear the plurality of mobile phones hears the audio file.

11. The method of claim 10, wherein the synchronization comprises pulsing a synchronization pulse from a first of the mobile phones to a second of the mobile phones.

12. The method of claim 11, wherein the synchronization further comprises communicating a loudspeaker delay for playing the assigned portion between the second of the mobile phones and the first of the mobile phones.

13. The method of claim 10, wherein the playing of the assigned portions comprises:
a first of the mobile phones playing a first channel of the audio file and a second of the mobile phones playing a second channel of the audio file.

14. The method of claim 13, wherein the channels are stereo channels.

15. The method of claim 10, further comprising:
communicating the at least the portion of the audio file from a first of the mobile phones to a second of the mobile phones.

16. The method of claim 15, wherein the communication includes short distance wireless communication.

17. A computer program product comprising a computer-readable recording medium which stores instructions for performing the method of claim 10.

18. The system of claim 1, wherein the comparing includes interrogating others of the mobile devices to determine a frequency response range of the respective mobile device's loudspeaker.

19. A method for playing an audio file comprising:
assigning at least a portion of the audio file to each of a plurality of mobile phones;
synchronizing the mobile phones including:
wirelessly sending a test signal from a master one of the plurality of mobile phones to each of the other mobile phones,
initiating play of a test sound by each of the other mobile phones in response to receiving the test signal,
receiving the test sound by the master one of the plurality of mobile phones,
computing a time for the master one of the plurality of mobile phones to wirelessly send an initiation signal to each of the other mobile phones based on a time for each of the tests sounds to be received by the master one of the plurality of mobile phones, and
wirelessly sending an initiation signal to each of the other mobile phones at the computed time for the other mobile phone to initiate play of the other device; and
playing the assigned portions of the audio file contemporaneously on the synchronized mobile devices such that a listener positioned to hear the plurality of mobile devices hears the audio file.

* * * * *